UNITED STATES PATENT OFFICE.

OSCAR GÜNTHER AND LEOPOLD HESSE, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO DYESTUFF.

989,001. Specification of Letters Patent. Patented Apr. 11, 1911.

No Drawing. Application filed September 20, 1910. Serial No. 582,822.

*To all whom it may concern:*

Be it known that we, OSCAR GÜNTHER and LEOPOLD HESSE, residing at Elberfeld, and ARTHUR ZART, residing at Vohwinkel, Germany, doctors of philosophy, chemists, citizens of the German Empire, have invented a New Dye, of which the following is a specification.

Our invention relates to the preparation of new azo dyestuffs which are obtained by combining the diazo compound of 2.4-dinitranilin with sulfonic acids of aryl-beta-naphthylamins.

The formation of the new body is probably best illustrated by the following equation:

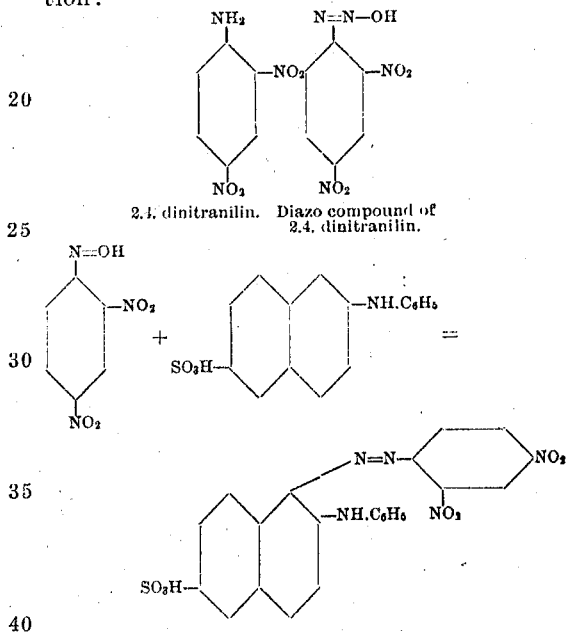

The new dyestuffs are after being dried and pulverized dark powders soluble in concentrated sulfuric acid generally with a red color; yielding upon reduction with stannous chlorid and hydrochloric acid 1.2.4-triaminobenzene and a sulfonic acid of an amino-beta-arylnaphthylamin. They are acid dyeing colors, which produce on wool very level brown to black shades of good fastness to fulling and to light, distinguished by their good resistance to the action of boiling mineral acids.

In order to illustrate the new process more fully we can proceed as follows, the parts being by weight:—183 parts of 2.4-dinitranilin are diazotized according to the method of diazotation described in British Letters Patent No. 6197/1894 with nitrosyl-sulfuric acid. The diazo compound is diluted with ice and added at about 0° C. to a suspension of 321 parts of the sodium salt of beta-phenyl-naphthylamin-6-sulfonic acid of the formula:

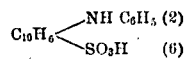

The combination is complete after a short time, but the stirring of the mixture is continued for some hours. The dye is then filtered off and dried. It is a bluish-black powder soluble in concentrated sulfuric acid with a red color; yielding upon reduction with stannous chlorid and hydrochloric acid 1.2.4-triaminobenzene and 1-amino-2-phenylaminonaphthalene-6-sulfonic acid. It dyes wool from acid baths a black.

Instead of phenyl-beta-naphthylamin-6-sulfonic acid other sulfonic acids e. g. 5- or 7-sulfonic- or 5.7- or 6.8-disulfonic acid or sulfonic acids of other aryl compounds such as the corresponding tolyl- or xylyl compounds, etc., may be used. From the 2-phenylnapthylamin-8-sulfonic acid a brown dye is obtained.

Sulfonic acids of aryl-beta-naphthylamins which contain the sulfonic group in the aryl radical e. g. the beta- phenylnaphthylamin sulfonic acid:

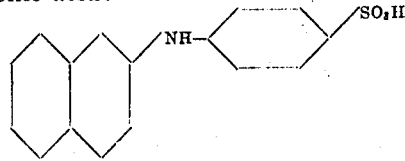

obtained from beta-naphthol and metanilic acid may be used. Dyes of similar properties are obtained.

We claim:—

1. The herein-described new azo dyestuffs obtainable by reacting with the diazo compound of 2.4-dinitranilin upon sulfonic acids of aryl-beta-naphthylamins which are after being dried and pulverized in the shape of their alkaline salts dark powders, soluble in concentrated sulfuric acid generally with a red color; yielding upon reduction with stannous chlorid and hydrochloric acid 1.2.4-triaminobenzene and a sulfonic acid of an amino-beta-arylnaphthylamin; dyeing wool from acid baths level brown to black shades distinguished by their good resistance to the action of boiling mineral acids, substantially as described.

2. The herein-described new azo dyestuff obtainable by reacting with diazotized 2.4-dinitranilin upon beta-phenylnaphthylamin-6-sulfonic acid, which dye is after being dried and pulverized in the shape of its sodium salt a bluish-black powder soluble in concentrated sulfuric acid with a red color; yielding upon reduction with stannous chlorid and hydrochloric acid 1.2.4-triaminobenzene and 1-amino-2-phenylaminonaphthalene-6-sulfonic acid; dyeing wool from acid baths black, substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]

Witnesses:
CHAS. J. WRIGHT,
ALFRED HENKEL.